United States Patent [19]

Nishiyama et al.

[11] Patent Number: 5,455,736
[45] Date of Patent: Oct. 3, 1995

[54] TANTALUM SOLID-STATE ELECTROLYTIC CAPACITOR AND FABRICATION PROCESS THEREFOR

[75] Inventors: Toshihiko Nishiyama; Takashi Fukaumi; Koji Sakata; Satoshi Arai; Atsushi Kobayashi, all of Tokyo, Japan

[73] Assignee: NEC Corporation, Tokyo, Japan

[21] Appl. No.: 325,594

[22] Filed: Oct. 19, 1994

[30] Foreign Application Priority Data

Oct. 20, 1993 [JP] Japan .................................. 5-262453

[51] Int. Cl.$^6$ .................................................. H01G 9/025
[52] U.S. Cl. ............................ 361/525; 29/25.03; 361/523
[58] Field of Search ..................................... 361/523–525, 361/528, 529; 29/25.03; 427/80; 252/500, 511

[56] References Cited

U.S. PATENT DOCUMENTS

| | | | |
|---|---|---|---|
| 4,780,796 | 10/1988 | Fukuda et al. | 361/523 |
| 4,803,596 | 2/1989 | Hellwig et al. | 361/525 |
| 4,858,078 | 8/1989 | Morimoto et al. | 361/527 |
| 5,223,002 | 6/1993 | Ross | 361/523 |

FOREIGN PATENT DOCUMENTS

| | | |
|---|---|---|
| 456445 | 2/1985 | Japan . |
| 62-29124 | 2/1987 | Japan . |

*Primary Examiner*—Kristine L. Kincaid
*Assistant Examiner*—Michael D. Switzer
*Attorney, Agent, or Firm*—Sughrue, Mion, Zinn, Macpeak & Seas

[57] ABSTRACT

A solid-state electrolytic capacitor reduces the possibility of failure due to increasing of a leakage current during application of voltage for a long period and thus improves reliability. The solid-state electrolytic capacitor has a conductive high polymeric compound deposited on a dielectric oxidation layer covering the surface of pore in a tantalum plate while maintaining voids. The void surface acts as an oxygen supply source.

10 Claims, 2 Drawing Sheets

TANTALUM SOLID-STATE ELECTROLYTIC CAPACITOR AND FABRICATION PROCESS THEREFOR

BACKGROUND OF THE INVENTION

1. Field of the Invention

The present invention relates to a tantalum solid-state electrolytic capacitor and a fabrication process therefor, more particularly to a tantalum solid-state electrolytic capacitor in which a conductive high polymeric compound is formed through chemical oxidation polymerization as a solid-state electrolyte.

2. Description of the Related Art

In general, a tantalum solid-state electrolytic capacitor is constituted of a sintered body obtained through sintering of tantalum powder, a tantalum oxide layer formed on the surface of the sintered body, a solid-state electrolyte on the tantalum oxide layer, and a conductive layer, such as a graphite layer, a silver layer and so forth, formed on the solid-state electrolyte. The capacitor is polarized, in which a metal tantalum generally becomes an anode side electrode and the conductive layer on the solid-state electrolyte becomes a cathode side electrode.

Here, as the solid-state electrolyte, manganese dioxide has conventionally been frequently used. However, in recent years, for the purpose of improvement of capacitor characteristics and reliability, there has been proposed the solid-state electrolyte formed of a conductive high polymeric compound, such as polypyrrole and so forth in place of the manganese dioxide. Such a proposal has been disclosed in Japanese Examined Patent Publication (Kokoku) No. Heisei 4-56445 (Japanese Patent Application No. Showa 58-144374), for example.

The solid-state electrolytic capacitor employing the conductive high polymeric compound as the solid-state electrolyte has the following superior characteristics in comparison with one employing manganese dioxide, as pointed out in the foregoing publication.

(1) Since the conductivity of the conductive high polymeric compound is several tens times greater than that of the manganese dioxide, it has excellent high frequency characteristics. Therefore, the conductive high polymeric compound is desirable for its capability of adaption for recent rising of operation frequency of electronic devices.

(2) As pointed out in the above-identified publication, since in the capacitor employing the manganese dioxide, the manganese dioxide is produced by pyrolysis of manganese nitrate, thermal stress of 200° to 300° C. is applied to the sintered body (already formed with the surface oxide layer) during production process. Therefore, defects in the surface oxide layer can cause increased leakage current. In contrast to this, the capacitor employing the conductive high polymeric compound as the solid-state electrolyte, does not require such heat treatment at high temperature during production process, Therefore, the surface oxide layer cannot be damaged so as to have lesser variation of characteristics and occurrence of failure in long period use. Therefore, the conductive high polymeric compound may provide higher reliability.

(3) When defects are caused in the surface oxide layer, since the conductive high polymeric compound has lower self-healing temperature than that of the manganese dioxide, the maintenance of the surface oxide layer can be performed in fine leakage current regions. Even at this point, the conductive high polymeric compound may provide higher reliability.

The present invention relates to the tantalum solid-state electrolytic capacitor, in which the conductive high polymeric compound is employed as a solid-state electrolyte.

In the solid-state electrolytic capacitor of this type, there are generally two production processes for producing the conductive high polymeric compound as the solid-state electrolyte, i.e., a method employing electrolytic oxidation polymerization and a method employing chemical oxidation polymerization. In the case of the electrolytic oxidation polymerization, since the surface oxide layer as a dielectric body is electrically insulative, it is difficult to directly form the conductive high polymeric compound on the surface oxide layer. Therefore, it is inherent to form some pre-coat having conductivity, such as manganese dioxide, conductive high polymeric compound layer formed by a chemical oxidation polymerization process or so forth on the surface oxide layer and to form the conductive high polymeric compound with externally contacting an electrode to the conductor thus formed. This makes the production process complicated.

In the chemical oxidation polymerization process as another method for forming the conductive high polymeric compound, there is a process (1) for forming the conductive high polymeric compound by alternately dipping into oxidizing material solution and monomeric solution and a process (2), in which a solution of a mixture of the oxidizing material and monomer is maintained at a temperature lower than a reaction temperature to progress polymerizing reaction, after dipping the sintered body (on which the surface oxide layer is already formed) in the mixture solution, the sintered body is removed from the mixture solution and subject to a temperature higher than or equal to the temperature at which polymerization is initiated to progress polymerization is progressed.

FIG. 1 diagrammatically illustrates sectional construction of the conventional tantalum solid-state electrolytic capacitor employing the conductive high polymeric compound as the solid-state electrolyte. As shown in FIG. 1, a sintered body (tantalum plate 1 in FIG. 1) has a large surface area due to pore 1a formed through sintering of the tantalum powder. On the surface of the tantalum plate 1 (surface of the pore 1a), a thin tantalum oxide layer ($Ta_2O_5$) 2 is formed. Furthermore, on the thin tantalum oxide layer 2, the conductive high polymeric compound 3 as solid-state electrolyte is formed. On the conductive high polymeric compound 3, a cathode side electrode 4 is formed. As the cathode side electrode 4, a conductor formed by laminating a graphite layer and a silver layer in order. In relation to the present invention, the conventional capacitor is characterized in that the conductive high polymeric compound 3 completely fills the pore 1a on the surface of the tantalum plate 1.

As set forth above, the conventional tantalum solid-state electrolytic capacitor employing the conductive high polymeric compound as the solid-state electrolyte has been considered to have superior high frequency characteristics and higher reliability in comparison with the capacitor employing the manganese dioxide.

However, through investigation made by the inventors, it has been found that both capacitors, i.e., the tantalum solid-state electrolytic capacitor and the capacitor employing manganese dioxide have substantially equal reliability. For instance, when a loaded life test (a test for reliability with loading a voltage for a long period) was performed as a test for reliability, there was no substantial difference in the rate of occurrence of failure between the capacitors. Also, the mode of failure in the tantalum solid-state electrolytic capacitor was heating due to large leak current, firing of the tantalum plate 1 as the solid-state electrolyte or the external resin cover layer (not shown) due to the heat and therefore, no significant difference to the capacitor employing the manganese dioxide can be observed.

SUMMARY OF THE INVENTION

Therefore, it is an object of the present invention to provide a tantalum solid-state electrolytic capacitor which employs conductive high polymeric compound as solid-state electrolyte, has an excellent high frequency characteristics superior to the conventional capacitor employing manganese dioxide, taking advantage of using the conductive high polymeric compound and further has higher reliability than the conventional tantalum solid-state electrolytic capacitor.

Another object of the present invention is to provide a process for fabricating a tantalum solid-state electrolytic capacitor having excellent high frequency characteristics and high reliability.

In accordance with the present invention, a tantalum solid-state electrolytic capacitor comprises a sintered body of tantalum powder, a dielectric surface oxide layer formed on the surface of the sintered body, a conductive high polymeric compound as a solid-state electrolyte covering the dielectric surface oxide layer, in which the conductive high polymeric compound covers the dielectric surface oxide layer and leaves a void in the pore forming the surface of the sintered body.

Such a tantalum solid-state electrolytic capacitor is produced by a fabrication process employing chemical oxidation polymerization for formation of the conductive high polymeric compound on the dielectric surface oxide layer, and the filling rate of the pore of the conductive high polymeric compound is adjusted by repeatedly performing the chemical oxidation polymerization.

The tantalum solid-state electrolytic capacitor according to the present invention employs a conductive high polymeric compound having high conductivity as a solid-state electrolyte and has a construction to define a void to serve as the oxygen supply source. Accordingly, even when a defect is formed in the surface oxide layer, by the heat generated by the leak current flowing through the defective portion and oxygen supplied from the void, the conductive high polymeric compound is converted into insulative. Therefore, the current path from the anode side electrode to the cathode side electrode can be blocked to recover the function of the capacitor.

In order to supply a sufficient amount of oxygen for the conductive high polymeric compound from the void, the volume of the conductive high polymeric compound occupying the volume of the pore is desired to be less than or equal to 70%. In such a case, control of the pore filling rate can be accurately performed by forming conductive high polymeric compound by divided several times of chemical oxidation polymerization.

As set forth above, according to the present invention, the present invention can provide the tantalum solid-state electrolytic capacitor having better high frequency characteristics than the capacitor employing manganese dioxide. Also, the tantalum solid-state electrolytic capacitor can provide higher reliability than the conventional tantalum solid-state electrolytic capacitor.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

Figure 1:
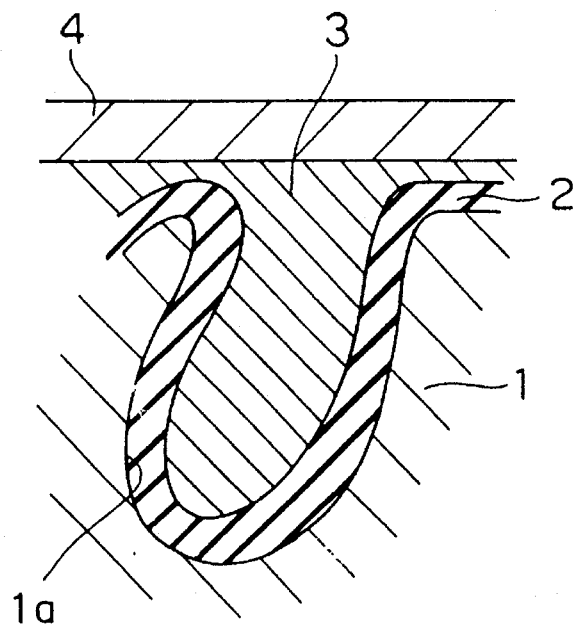
FIG. 1 is a section diagrammatically showing the sectional construction of the conventional tantalum solid-state electrolytic capacitor employing a conductive high polymeric compound.

The present invention will be discussed in detail with reference to FIGS. 3 and 4 in terms of the preferred embodiment. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the investigation made by the inventors, it has been found that the fact of no significant difference in reliability and conditions at the occurrence of failure between the tantalum solid-state electrolytic capacitor and the capacitor employing manganese dioxide resides not on small differences in physical and chemical properties of the conductive high polymeric compound and manganese dioxide, but rather due to the structural feature of the capacitor. Namely, the structure of completely filling up the pore forming the surface of the tantalum sintered body by conductive high polymeric compound is considered to border for making the feature of conductive high polymeric compound effective. Further discussion to this point will be given herebelow.

Again referring to FIG. 1, the conventional capacitor employing the conductive high polymeric compound has the pore forming the surface of the tantalum plate 1 filled up by the conductive high polymeric compound. Here, as shown in FIG. 2, assuming that a defect 5 is caused in the tantalum surface oxide layer 2, the capacitor generates a heat by a leak current flowing from the tantalum plate 1 to the cathode side electrode 4 via the defect 5. The region in the vicinity of the defect becomes particularly high temperature. At this time, in the case of the capacitor having the structure as shown in FIG. 2, in which the pore is filled up by the conductive high polymeric compound 3, the conductive high polymeric compound 3 cannot receive external supply of oxygen. As a result, by the high temperature generated by the leak current, the pyrolysis of the conductive high polymeric compound 3 is caused to leave carbonate 6 having conductivity in the pore. Thus, shorting condition between the anode side electrode (tantalum plate 1) and the cathode side electrode 4 is maintained to finally result in high temperature of the tantalum plate 1 or the externally covering resin (not shown) in the worst case.

The inventors have made extensive study for solving the problem of increasing of the leak current by application of voltage for a long period and firing potentially caused by increasing of the leak current. As a result, a finding is reached that by providing a source of oxygen for the conductive high polymeric compound, the conductive high polymeric compound can be made partially insulative to effectively suppress increasing of the leak current during long period application of the voltage. The tantalum solid-state electrolytic capacitor according to the present invention, as illustrated in FIG. 3 has been made on the basis of this finding.

Figure 2:
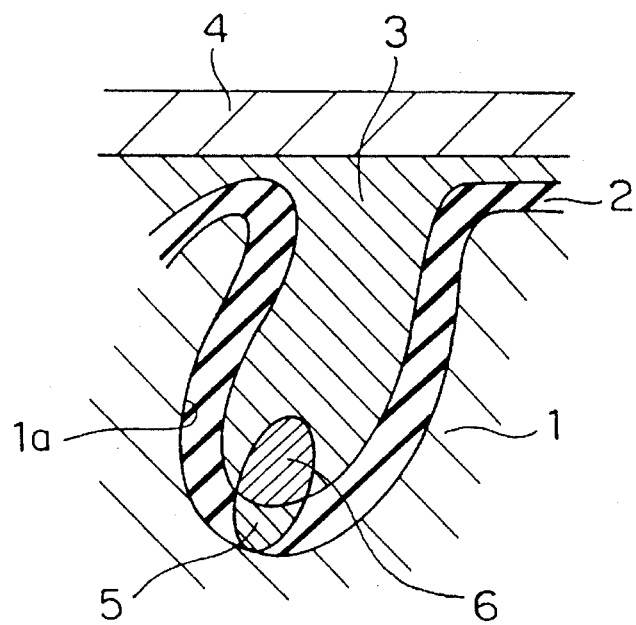
FIG. 2 is a section diagrammatically showing the condition where defect is caused in a surface oxide layer in the tantalum solid-state electrolytic capacitor of FIG. 1.
Figure 3:
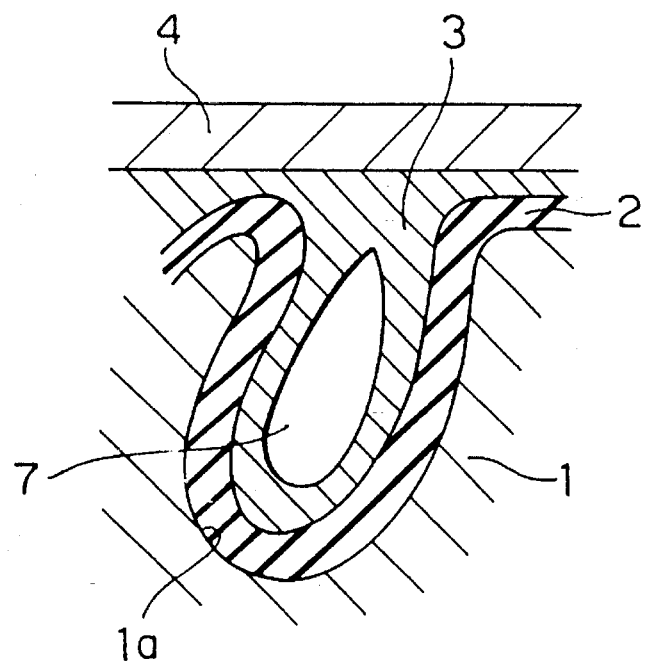
FIG. 3 is a section diagrammatically showing the preferred embodiment of a tantalum solid-state electrolytic capacitor according to the present invention.
Figure 4:
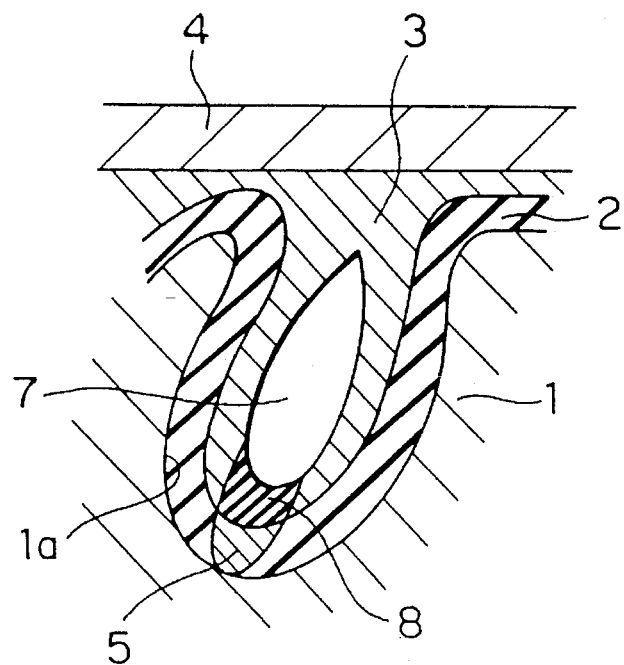
FIG. 4 is a section diagrammatically showing the condition where defect is caused in a surface oxide layer in the tantalum solid-state electrolytic capacitor of FIG. 3.

Namely, referring to FIG. 3, the capacitor according to the present invention is differentiated from the conventional capacitor illustrated in FIG. 1, in the presence of the void 7. The void serves as an oxygen supply source for the conductive high polymeric compound 3. When oxygen molecular is sufficiently present around the conductive high polymeric compound 3, even if the defect 5 is caused in the surface oxide layer 2 as shown in FIG. 2, the conductive high polymeric compound 3 on the defect 5 is converted to be insulative by the leak current flowing through the defect 5. Therefore, the current path from the anode side electrode (tantalum plate 1) and the cathode side electrode 4 is blocked by the conductive high polymeric compound converted to be insulative.

In case of the conventional capacitor, since the void as the oxygen supply source is not provided and the pore 1a is completely filled with the conductive high polymeric compound, oxygen cannot be supplied to the conductive high polymeric compound. Accordingly, no oxidation is caused in the conductive high polymeric compound and the conductive high polymeric compound is not converted to be insulative. Therefore, the leak current continues flowing to leak firing.

From the fact set forth above, in the tantalum solid-state electrolytic capacitor according to the present invention, certain volume is required for the air to be supplied, i.e. the volume of the void. Therefore, the ratio of the volume of the conductive high polymeric compound 3 filled in the void, versus the volume of the void (pore filling rate has certain upper limit. From the study made by the inventors, the effect in expansion of the life in the reliability test (loaded life test) becomes remarkable when the volume of the conductive high polymeric compound 3 is less than or equal to 70% of the volume of the void.

The void 7 as the oxygen supply source can be obtained by forming the layer of the conductive high polymeric compound 3 not in one operation but in several operations in divided manner. Namely, by repeating a process to form a thin conductive high polymeric compound for a several times, the void can be certainly maintained and filling rate of the pore can be accurately controlled.

The conductive high polymeric compound 3 to be employed in the present invention is not specifically limited as long as it can be formed by chemical polymerization, and can be polypyrrole, polyaniline and so forth, for example. Also, similar effect can be obtained by dipping the tantalum sintered body into a solution of a soluble polypyrrole, polyaniline or their derivatives.

Next, preferred examples of the present invention will be discussed.

EXAMPLE 1

A pyrrole solution containing pyrrole and ethanol in a weight ratio of 30:70 and a oxidation agent solution containing iron (III) oxide dodecylbenzenesulfonate and ethanol in a weight ratio of 40:60 are mixed at equal amount. The mixture liquid is filtered by a filtration paper. The product on the filtration paper is washed by water and then dried at 50° C. for one hour under vacuum condition. After drying, the product was formed in to a pellet form by a pellet forming machine. A density of the conductive high polymeric compound in the pellet was derived from a measured weight and volume, and then a conductivity is measured by a three terminal method. The obtained density was 1.37 g/cm$^3$ and the conductivity was 8.7 S/cm.

Next, a sintered body prepared by sintering tantalum powder was anode oxidized in a solution of phosphoric acid to form a tantalum surface oxide layer 2 (see FIG. 3). Thereafter, by dipping to pyrrole solution and oxidation agent solution same those used in preparation of the foregoing conductive high polymeric compound, in order, the conductive high polymeric compound was formed by chemical oxidation polymerization. Namely, the tantalum sintered body was dipped into the pyrrole solution containing pyrrole and ethanol in a weight ratio of 30:70 and the oxidation agent solution containing iron (III) oxide dodecylbenzenesulfonate and ethanol in a weight ratio of 40:60, in order.

After completion of reaction, non-reacted oxidation agent and excessive acid were removed by water washing. Subsequently, the resultant product, i.e. the sintered body formed the conductive high polymeric compound thereon, was dried at 50° C. for one hour under vacuum. Next, by measuring the weight and subtracting the weight of the sintered body from the measured weight, the weight of the conductive high polymeric compound formed was derived. Then, on the basis of the density of the conductive high polymeric compound measured in advance, volume of the formed conductive high polymeric compound was derived. From the value thus obtained, the pore filing rate of the sintered body was calculated employing the following equation (1). Then, until this value becomes 100%, the foregoing chemical oxidation polymerization was repeated for six times.

Pore Filing Rate=(Volume of Conductive High Polymeric Compound)/(Total Pore Volume of Tantalum Sintered Body)×100(%)

It should be noted that by estimating an error to be contained in the result of calculation in the foregoing equation (1) by the polypyrrole (conductive high polymeric) compound) formed on the external surface of the sintered body, the section of the sintered body after formation of the polypyrrole was observed to obtain thickness of polypyrrole formed on the external surface of the sintered body. The resultant error contained in the foregoing equation (1) was 5% at maximum.

In the shown example, a sample 1 was formed polypyrrole as the solid-state electrolyte by six times chemical oxidation polymerization, a sample 2 was formed polypyrrole by three times chemical oxidation polymerization, and a sample 3 was formed polypyrrole by single chemical oxidation polymerization. For these samples, graphite layer and silver layer were formed sequentially as cathode electrodes 4 (see FIG. 3) and external resin layer (not shown) were formed. Then, initial characteristics (capacity, equivalent series resistance and leak current) of the capacitor was measured. The results of measurement are shown in the following table 1. It should be noted that, in the table 1, capacity was the value at a measuring frequency 120 Hz, the equivalent series resistance was the value at the measuring frequency 100 kHz, and the leak current is the value after one minutes with applying DC voltage of 10 V.

Next, with respect to each sample, reliability test was performed. The test was the loaded life test. Namely, 50 of each sample were placed in a constant temperature bath at 105° C. Then a direct current voltage in a magnitude 50% of the surface oxide layer forming voltage was applied. At elapsed times of 250 hours, 500 hours, 1000 hours and 2000 hours, the samples were removed from the bath and number of faulty samples were counted by measuring the leak current. The results are shown in the following table 2. It should be noted that failure was defined to have the leak current after the predetermined period greater than that before initiation of test in the extent 5 times or more.

EXAMPLE 2

In place of the oxidation agent solution as employed in the first embodiment, an oxidation agent solution containing iron (III) oxide dodecylbenzenesulfonate and ethanol in a weight ratio of 10:90 was employed. The operations identical to the first embodiment was then performed to form conductive high polymeric compound. The conductive high polymeric compound thus formed had density of 1.42 g/cm$^3$ and conductivity of 10.2 S/cm. In order to achieve 100% of pore filling rate of conductive high polymeric compound, a sample 4 required ten times of chemical oxidation polymerization, a sample 5 required five times of chemical oxidation polymerization, and a sample 6 required three times of chemical oxidation polymerization. With respect to these samples, measurement of the initial characteristics and reliability test were performed. It should be noted that the condition of reliability test and the condition for detecting the failure were the same as those in the first embodiment. The results of measurement are shown in the table 1 and the results of test are shown in the table 2.

EXAMPLE 3

At first, the oxidation agent solution same as that employed in the first embodiment and pyrrole solution in the equal amount to the former were placed in glass bowls. The glass bowls are placed within a methanol bath with taking a dry ice as cooling medium. In order to suppress reaction upon mixing, two solutions are mixed to prepare a reaction liquid after confirmation that both solutions are cooled at −40° C. or lower. The reaction liquid was then removed from the methanol bath under a room temperature. After 30 minutes, in which the reaction liquid was exposed to the room temperature, the reaction liquid was filtered by a filtration paper. Then, with the same operation to the first embodiment, the conductivity of the conductive high polymeric compound was measured. The obtained conductive high polymeric compound has a density of 1.45 g/cm$^3$ and the conductivity of 15.4 S/cm.

Next, the sintered body which was already prepared the surface oxide layer in the same operation to the first embodiment, was dipped into the reaction liquid maintained at a temperature at −40° C. or lower. Subsequently, the dipped sintered body was left in the room temperature for 30 minutes to form the conductive high polymeric compound layer on the surface oxide layer. In the shown example, a sample 7 was prepared by repeating chemical oxidation polymerization four times, a sample 8 was prepared by repeating chemical oxidation polymerization twice, and a sample 9 was prepared by single chemical oxidation polymerization process. In the chemical oxidation polymerization performed in this method, since no pyrrole will melt out into the oxidation agent solution, which was caused in the first embodiment, most of pyrrole penetrated in the sintered body resides on the sintered body in a form of polypyrrole. Therefore, the pore filling rate reaches at 100% at four times of chemical oxidation polymerization.

With respect to each sample obtained in the shown example, initial characteristics measurement and the reliability test were performed. The conditions of measurement, testing and detection of failure were the same as those of the first and second examples. The initial characteristics are shown in the table 1 and the results of test are shown in the table 2.

TABLE 1

INITIAL CHARACTERISTICS OF CAPACITOR

| | Sample No. | Capacity (μF) | Equivalent Series Resistance (m | Leak Current (nA) | Pore Filling Rate (%) |
|---|---|---|---|---|---|
| Ex. 1 | Sample 1 | 10.1 | 450 | 15 | 100 |
| | Sample 2 | 9.6 | 250 | 14 | 65 |
| | Sample 3 | 7.1 | 1200 | 19 | 40 |
| Ex. 2 | Sample 4 | 9.5 | 300 | 10 | 100 |
| | Sample 5 | 9.1 | 200 | 15 | 63 |
| | Sample 6 | 3.7 | 4700 | 21 | 27 |
| Ex. 3 | Sample 7 | 10.3 | 310 | 11 | 100 |
| | Sample 8 | 9.8 | 220 | 9 | 69 |
| | Sample 9 | 8.5 | 970 | 17 | 52 |

TABLE 2

OCCURRENCE OF LEAK CURRENT FAILURE IN LOADED LIFE TEST

| | Sample No. | 250 h | 500 h | 1000 h | 2000 h |
|---|---|---|---|---|---|
| Ex. 1 | Sample 1 | 0 | 1 | 3 | 7 |
| | Sample 2 | 0 | 0 | 0 | 0 |
| | Sample 3 | 0 | 0 | 0 | 0 |
| Ex. 2 | Sample 4 | 0 | 2 | 7 | 16 |
| | Sample 5 | 0 | 0 | 0 | 0 |
| | Sample 6 | 0 | 0 | 1 | 1 |
| Ex. 3 | Sample 7 | 0 | 1 | 4 | 9 |
| | Sample 8 | 0 | 0 | 1 | 1 |
| | Sample 9 | 0 | 0 | 0 | 0 |

With reference to the foregoing tables 1 and 2, in either examples 1, 2 and 3, the samples whose pore filling rate is less than or equal to 70% (samples 2, 3, 5, 6, 8 and 9) have significantly smaller rate of occurrence of failure in the reliability test (loaded life test) in comparison with the samples having pore filling rate greater than 70% (samples 1, 4 and 7). Namely, in three examples, the number of occurrence of failure can be reduced to be at least one-ninth at 2000 hours elapsed.

Here, among the initial characteristics of the capacitor as shown in the table 1, the equivalent series resistances of the samples having relatively low pore filling rate (samples 3, 6 and 9) becomes higher than other samples. This does not mean the function of the void as the oxygen supply source in the present invention is degraded. Increasing of the equivalent series resistance is caused by thinner thickness of the conductive high polymeric compound by reduction of the pore filing rate. Therefore, by appropriately selecting the dopant for higher conductivity of the conductive high polymeric compound, increasing of the equivalent series resistance can be suppressed. Alternatively, by making the configuration of the sintered body greater to provide grater volume to the pore, the equivalent series resistance of the capacitor can be lowered by providing sufficient thickness of the conductive high polymeric compound with maintaining pore filling rate at less than 70%.

While the present invention has been disclosed in detail in terms of the preferred embodiment of the invention, it should be obvious to those skilled in the art to modify, change or re-constructed the embodiment set forth above, or to implement the invention in different way encompassed by the principle of the invention defined in the appended claims. Therefore, the invention should be appreciated to include all possible modifications, constructions established without departing from the invention.

What is claimed is:

1. A tantalum solid-state electrolytic capacitor comprising:
    an anode side electrode formed of a sintered body of tantalum powder, which tantalum sintered body has a plurality of pores on the surface;
    a dielectric surface oxide layer covering the surface of said pores;
    solid-state electrolyte formed of a conductive high polymeric compound covering said dielectric surface oxide layer, which solid-state electrolyte defines a plurality of voids; and
    a cathode side electrode formed on the surface of said solid-state electrolyte.

2. A tantalum solid-state electrolytic capacitor as set forth in claim 1, wherein the volume of said solid-state electrolyte is less than or equal to 70% of the volume of said pores.

3. A tantalum solid-state electrolytic capacitor as set forth in claim 1, wherein said conductive high polymeric compound is a polypyrrole or polyaniline.

4. A tantalum solid-state electrolytic capacitor as set forth in claim 1, wherein said cathode side electrode is a laminated body of a graphite layer and a silver layer.

5. A tantalum solid-state electrolytic capacitor comprising:
    an anode side electrode formed of a sintered body of tantalum powder, which tantalum sintered body has a plurality of pores on the surface;
    dielectric surface oxide layer covering the surface of said pores;
    a solid-state electrolyte formed of a polypyrrole or polyaniline and covering said dielectric surface oxide layer, which solid-state electrolyte defines a plurality of voids, the volume of said solid-state electrolyte being less than or equal to 70% of the volume of said pores; and
    a cathode side electrode formed on the surface of said solid-state electrolyte.

6. A fabrication process for producing a tantalum solid-state electrolytic capacitor comprising the steps of:
    forming a dielectric surface oxide layer on the surface of a sintered body of a tantalum powder having a plurality of pores on the surface and serving as an anode side electrode;
    forming a conductive high polymeric compound as a solid-state electrolyte on said dielectric surface oxide layer by chemical oxidation polymerization;
    repeating said chemical oxidation polymerization for burying pores by said conductive high polymeric compound having voids therein; and
    forming a cathode side electrode on the surface of said conductive high polymeric compound.

7. A tantalum solid-state electrolytic capacitor fabricating process as set forth in claim 6, wherein said dielectric surface oxide layer is formed by anode oxidation of said sintered body within a solution of phosphate acid.

8. A tantalum solid-state electrolytic capacitor fabricating process as set forth in claim 6, wherein said step of forming said conductive high polymeric compound by chemical oxidation polymerization is performed by sequentially dipping said sintered body with said dielectric surface oxide layer into a pyrrole solution and an oxidation agent solution.

9. A tantalum solid-state electrolytic capacitor fabricating process as set forth in claim 8, wherein said oxidation agent is a mixture of iron (III) oxide dodecylbenzenesulfonate and ethanol.

10. A tantalum solid-state electrolytic capacitor fabricating process as set forth in claim 6, wherein the number of times to repeat said chemical oxidation polymerization is determined by obtaining a weight of said formed conductive high polymeric compound and obtaining a volume of said conductive high polymeric compound on the basis of the obtained weight and by deriving a filling rate for filling said conductive high polymeric compound into the pores of said sintered body.

* * * * *